INVENTOR
JULES R. VILLE

BY Spencer E. Olson

ATTORNEY

INVENTOR
JULES R. VILLE
BY Spencer E. Olson
ATTORNEY 3,280,344
STORED CHARGE INFORMATION TRANSFER CIRCUITS Jules R. Ville, Mountain View, Calif., assignor to Sylvania Electric Products Inc., a corporation of Delaware Filed July 6, 1964, Ser. No. 380,322
9 Claims. (Cl. 307—88.5)

This invention relates generally to stored charge information transfer circuits employing solid-state devices, and more particularly to means for sampling, temporarily storing, and transferring binary information from one bistable stage to another in response to a shift pulse.

Temporary storage of information while shifting is required in circuits such as binary shift registers, sequence generators, and logic circuits. One conventional storage method employed in transistor binary shift registers comprises RC or RLC delay networks which store potentials obtained from the collector outputs of a previous shift register stage which are, in turn, used to differentially determine to which base electrode of a saturated bistable the shift trigger is applied. This is known as trigger steering. As speed is increased, these delay network outputs cannot be made to assume the new potentials required after each shift without excessive loading of the previous stage. Hence, intermediate amplifiers are often employed, which is known as amplified steering. Such circuits, however, have relatively low speed capabilities, are relatively complex, and require capacitors, which are undesirable in some applications.

Another conventional shift register design uses a delay line for storage which receives the transient induced in a collector electrode, as it is switched to "off" by a shift pulse, and forwards this transient to the base of the next stage. Although this circuit is capable of relatively high speed operation, the required delay line is complicated.

A known high speed digital circuit transistor logic technique uses transistors as the gatin producing element and either diodes or transistors as threshold logic devices. Storage is provided by conventional cross-coupled flip-flops. The high gain of the transistor permits good fan-in and fan-out and tolerance to component and supply variations. This technique works well up to about twenty-five megacycles per second at which point the rise, storage, and fall times of the transistor become a major portion of the pulse period. Some recently available transistors increase the potential operation to seventy-five megacycles, but the resulting circuit is critical of trigger amplitude and waveform.

Tunnel diodes have very high switching speeds, many simple circuits employing them having been operated at speeds in excess of 500 megacycles. However, since tunnel diodes use the same ports for both input and output, a phased power supply must be used to make the information proceed from stage to stage in the desired direction. In practice, both three-phase and four-phase power suppy arrangements are used. The circuitry is sensitive to variations in both power supply amplitude and phase. When normal 10% variations in components are considered along with power supply variations it becomes difficult to obtain reliable operation of a complex system. In particular, the generation and distribution of a high frequency power supply poses many problems. Standing waves in the circuit distribution lines may cause amplitude variations since the load is variable, dependent on whether a tunnel diode is in its high- or low-voltage state. Also, the propagation velocity of the wave may cause phase shift between stages resulting in a loss of effective gain. These problems are so great that no system of any significant size has been built using tunnel diodes exclusively.

Although tunnel diodes offer a high speed capability, extremely critical circuit tolerances have forced designers toward hybrid circuits combining tunnel diodes with transistors, the transistor being used to isolate the separate input and output ports of the tunnel diode and eliminating the need for a multiple-phase power supply. The transistor provides threshold logic and high speed with the tunnel diode providing gain, or the diode may do the thresholding and fast switching with the transistor providing the gain. Either configuration gives substantially the same results. This technique is faster than the all transistor approach but is still limited by the speed of the transistor.

It is a general object of this invention to provide an improved stored charge information transfer circuit employing transistors and tunnel diodes.

It is a more particular object of the invention to provide a circuit for enabling the high speed transfer of the binary state of one transistor bistable to another transistor bistable.

Another object is to provide a relatively simple, high speed storage charge information transfer circuit which is particularly suitable for microcircuit applications.

Another object is to provide a high speed shift register in which conventional D.C. stable storage bistables are used, thereby permitting the circuit to be operated at any speed between zero frequency and the maximum design speed.

A further object is to provide a high speed tunnel diode shift register comprising relatively simple circuitry and having non-critical power supply and trigger levels.

Briefly, these objects are attained in a solid state logic circuit or shift register by employing a shunt connected charge-storage diode between two bistable stages. The output of the first bistable is connected through a coupling diode to the storage diode and another coupling diode is connected between the storage diode and the input of the next bistable stage. In order to shift binary informaion from one stage to the next, a shift pulse is applied through the storage diode to the bistables. A charge-storage diode builds up a charge of minority carriers when forward biased, resulting in an initial reverse current flow when the diode is reverse-biased. Hence, the storage diode charges during the shift pulse, if the preceding bistable is in the proper state. When the shift pulse returns to its quiescent state, the storage diode conducts in the reverse direction, thereby turning on the next bistable. If the preceding bistable is in the "off" condition, there is little or no diode charge during the shift pulse. Therefore, when the shift pulse returns to its quiescent state there is essentially no charge transferred to the next bistable, thereby leaving it in the "off" condition.

In one particularly useful implementation of this charge transfer technique, the shunt connected charge-storage diode is used for coupling between transistor flip-flops of a high speed shift register. The same stored charge phenomena that takes place in the storage diode can also occur in the base of the transistor. Hence, this implementation also makes use of the excess base stored charge of saturated transistors in transferring information from one stage to the next. The storage diode removes the excess stored charge from the base region of one flip-flop, permitting it to recover rapidly, and transfers this charge to the base of the next flip-flop stage, thereby rapidly turning it "on." The circuit is quite stable, relatively simple, and uses available components. In addition, it requires no capacitors.

Other objects features and advantages of the invention, and a better understanding of its operation, will become apparent from the following description, reference being had to the accompanying drawings, in which.

Figure 1:
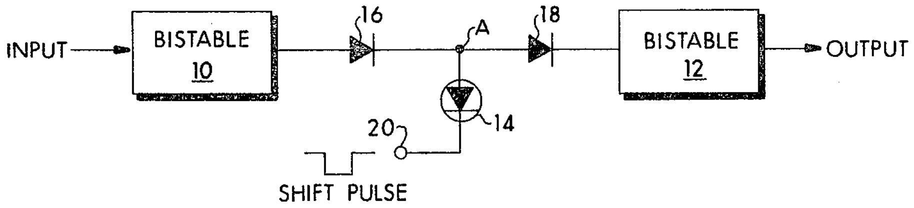
FIG. 1 is a simplified circuit diagram of the present invention.

Referring to FIG. 1, a simplified binary information storage and transfer circuit is shown comprising bistable stages 10 and 12 and a diode coupling network for sampling, temporarily storing, and transferring binary information from bistable 10 to bistable 12. The diode coupling network comprises shunt connected charge-storage diode 14 and series connected coupling diodes 16 and 18. The anode of diode 16 is connected to the output of bistable 10 and its cathode is connected to the anode of diode 14, represented as junction point A. The anode of diode 18 is connected to junction A and its cathode is connected to the input of bistable 12. Charge-storage diode 14 is arranged with the cathode connected to a source of negative shift pulses represented by terminal 20, and is used in this circuit as a high speed transfer device in a manner now to be described.

Conduction in semi-conductor junction diodes results in a buildup of minority charge carriers in the junction region. When the diode is then reverse-biased, it will conduct in the reverse direction for a short period of time while the minority carriers are swept out or recombined. The charge builds up exponentially during forward conduction and may be recovered by applying a reverse voltage step, thereby reverse-biasing the diode. The stored charge will keep the diode resistance low for a short period of time, allowing a high reverse current which may be many times greater than the forward current. While all semi-conductor diodes exhibit this charge storage characteristic to some degree, some diodes have been optimized for reverse conduction. In conventional diodes the reverse current recovers approximately exponentially; in charge-storage diodes, a graded field keeps the stored charge very close to the junction so that reverse conduction remains high during discharge. The diode rapidly recovers to a high impedance at the end of discharge. For this reason these diodes are sometimes called step recovery diodes, the recovery taking place in less than one nanosecond.

The amount of charge stored depends on the current through the diode and the minority carrier lifetime. The total charge stored in the steady state is $I_f \times T$ where $I_f$ is the forward current and T is the minority carrier lifetime. The stored charge as a function of time after the start of the forward current step is:

$$Q=I_fT\left(1-e^{\frac{-t_f}{T}}\right)$$

where $t_f$ is time from start of forward current.

If $t_f$ is smaller than T, the charge is approximately $I_ft_f$. In other words, if the charging time is short with respect to the carrier lifetime, essentially no charge will be lost due to recombination and all the charge is available for current in the reverse direction.

Current will flow in the reverse direction until the minority carriers are gone. Again, if the times are shorter than the carrier lifetime, very litle charge will be lost by recombination so that virtually all of the charge may be recovered in the reverse current. The magnitude of the reverse current is determined by circuit conditions external to the diodes. A high reverse current will flow if a large reverse voltage step is applied through a low impedance, and current again will result when the reverse current is higher than the forward current.

The device is relatively insensitive to the length of minority carrier lifetime, provided it is longer than the charging and discharging times. Reliable circuitry has been built using diodes having up to 5:1 variation in minority carrier lifetime. Use of diodes having minority carrier lifetimes much greater than the storage times should be avoided, since they tend to have a high junction capacity which causes an unwanted reverse current spike which reduces the signal to noise ratio.

The information transfer circuit shown in FIG. 1 operates as follows: In the quiescent condition, charge storage diode 14 is reverse biased by the potential at shift pulse terminal 20. If bistable 10 is in the "on" or high voltage state, application of a negative shift pulse through terminal 20 forward-biases diode 14 causing it to conduct and thereby build up a charge during the shift pulse. Effectively, charge-storage diode 14 rapidly pulls the stored charge from bistable 10 through coupling diode 16 and stores it for the duration of the shift pulse. When the shift pulse returns to its quiescent state, diode 14 conducts in the reverse direction through coupling diode 18, to "turn on" bistable 12; this is the charge stored in the junction region of diode 14 during the shift pulse is rapidly transferred to the next bistable at the end of this shift pulse.

If bistable 10 is initially in the "off" or low voltage state, charge-storage diode 14 removes little or no stored charge from bistable 10 during the shift pulse and, therefore, stores little or no charge while it is conducting. At the end of the shift pulse, diode 14 transfers little or no charge to bistable 12, and therefore bistable 12 remains in the "off" state.

Figure 2:
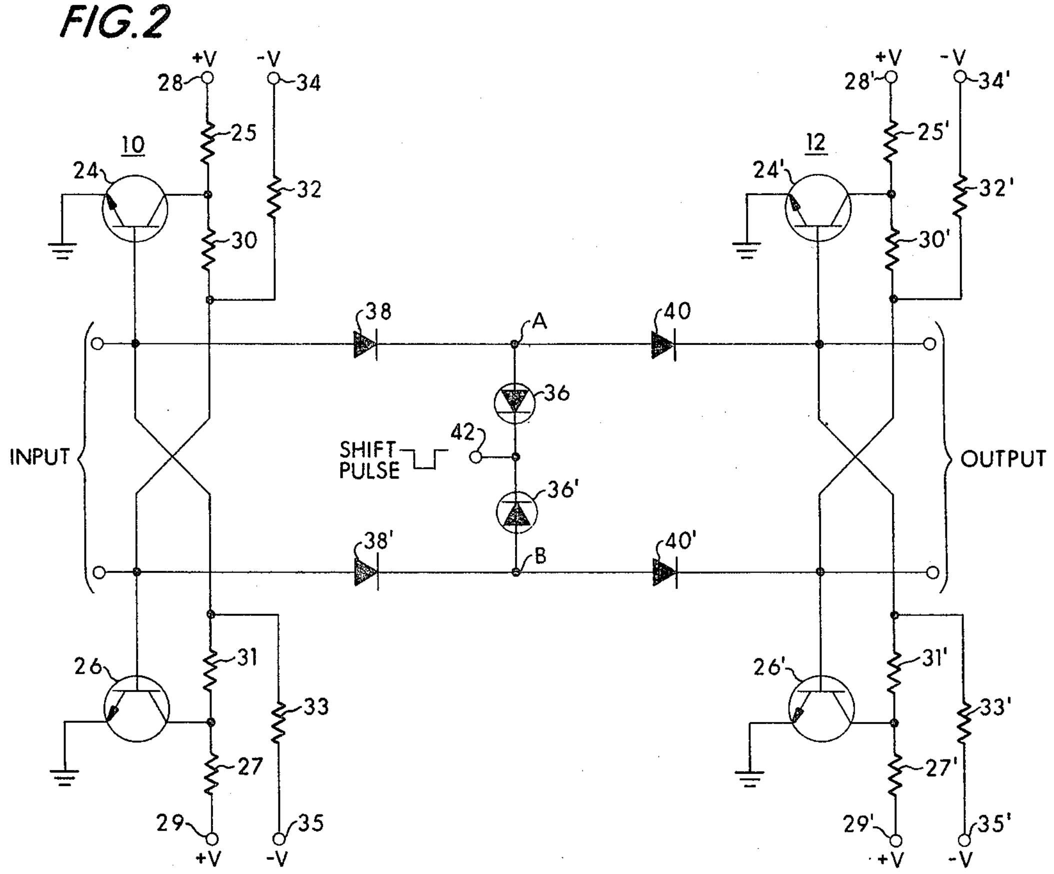
FIG. 2 is a schematic diagram of a transistor shift register employing a stored charge information transfer circuit in accordance with the present invention.

Referring now to FIG. 2, a high speed transistor shift register is shown as comprising a bistable store 10 and a bistable store 12 with an information transfer network including six diodes connected between the stores.

The bistable stores are conventional resistance coupled saturated transistor bistables. Flip-flop stage 10 comprises NPN transistors 24 and 26, the emitter electrodes of both of which are connected to ground. The collector electrodes are connected through respective resistors 25 and 27 to a source of poistive collector supply potential, represented by terminals 28 and 29, and the base electrodes are connected through respective cross-coupling resistors 30 and 31 to the collector electrode of the opposite transistor. The base electrodes are also connected through respective bias resistors 32 and 33 to a source of negative bias potential, represented by terminals 34 and 35. Flip-flop stage 12 comprises transistors 24′ and 26′ connected in identical fashion, corresponding components being identified by the same numerals primed. It will be understood that terminals 28, 29, 28′ and 29′ may constitute a common source of potential, and that terminals 34, 35, 34′ and 35′ may constitute a common source of negative potential. The D.C. design of the flip-flop stages provides substantial overdrive to the "on" transistor, thereby resulting in excess stored charge in the base-emitter diode.

The information transfer network between each pair of corresponding transistors of the flip-flop stages comprises a shunt connected charge-storage diode 36 and input and output isolating diodes 38 and 40, respectively. The anodes of diodes 38 and 38′ are respectively connected to the base electrodes of transistors 24 and 26, and the cathodes are respectively connected to junctions A and B. The anodes of diodes 40 and 40′ are respectively connected to junctions A and B, and the cathodes are respectively connected to the base electrodes of transistors 24′ and 26′. The anodes of charge-storage diodes 36 and 36′ are respectively connected to junctions A and B, and their cathodes are both connected to a source of shift pulses represented by terminal 42.

As discussed previously, when a semi-conductor junction diode conducts in the forward direction, minority carriers build up in the junction region. When the diode is reverse biased, current continues to flow, but in the reverse direction, until the minority carriers are dissipated. The shift register circuit shown in FIG. 2 makes use of the fact that this stored charge phenomena can occur in both the charge-storage diodes 36 and 36′ and in the base-to-emitter diodes of junction-type transistors. The use of stored charge of the saturated transistor emitter-base diode for a memory readout, rather than the usual collector voltage or current, provides a significant advantage. Since all the transistors are desaturated during memory readout, the bistables tend to simulate non-saturated bistable circuits with the inherent speed advantage of transistors so operated, but without the complexity.

If transistor 24 is "on," or conducting, during the quiescent period between shift pulses, the excess base current of this saturated transistor causes an excess charge to build up on the base of transistor 24. Output isolating diode 40 is cut off, and the quiescent voltage at shift pulse terminal 42 causes the charge-storage diode 36 also to be cut off. Upon application of the negative shift pulse through diodes 36 and 38 to the base of transistor 24, the "on" transistor in stage 10 is cut off. The shift pulse biases storage diode 36 to conduct in the forward direction, removing the excess stored charge from the base of transistor 24 and causing it to build up in the junction region of diode 36. Upon the return of the shift pulse to the quiescent level, diode 36 conducts in the reverse direction and discharges through the output isolating diode 40 into the base of transistor 24′. Hence, charge-storage diode 36 removes the excess stored charge from flip-flop stage 10, permitting it to recover rapidly, temporarily stores this charge for the duration of the shift pulse, and, at the end of the shift pulse, transfers this charge to flip-flop stage 10, thereby rapidly turning it on. While there is some loss of charge throughout the information transfer circuitry, the excess charge caused to be stored on the base of the "on" transistor compensates for the circuit losses to enable diode 36 to provide a sufficient charge to the base of the next transistor stage to turn it on. In this hybrid transistor-charge-storage diode shift register, therefore, the stored charge phenomena of the charge-storage diode junction and the transistor base junction cooperate to provide effective high speed transfer of information from one bistable stage to the next.

If transistor 24 is in the "off" state during the quiescence between shift pulses, there is essentially no current flow through the base of the transistor and, hence, no charge build up. As a consequence, during application of the shift pulse and the forward conduction of the charge-storage diode 36, there will be little or no charge transfer to the junction region of diode 36. On the return swing of the shift pulse, diode 36 transfers insufficient charge to the base of transistor 24′ to turn this transistor fully "on," and, therefore, flip-flop stage 12 remains in the off state.

The binary information transfer operations for corresponding transistors 26 and 26′ are provided in a similar fashion with the identical diode network connected at junction B.

It will be noted that the shift register of FIG. 2 consists of only two transistors, six diodes, and six resistors per bit of information storage; this represents a considerable reduction in complexity over most currently utilized circuitry. Further, it will be noted that there are no capacitors in the circuit, a factor which simplifies the adaptability of this type of circuitry to microminiaturization. An implementation of this circuit comprising "off the shelf" transistors type 2N709 and ordinary, slow recovery silicon diodes for the charge-storage diodes operated at 35 mc. The limitation in speed was caused by the limitation of the storage diode to provide a good charge to discharge ratio at high speed. Much higher operational speeds are attainable by using some of the newly available components such as step diodes for charge-storage (e.g. Hewlett Packard type BA0101 and General Electric "Snap-off" type) and lower input capacity transistors.

Figure 3:
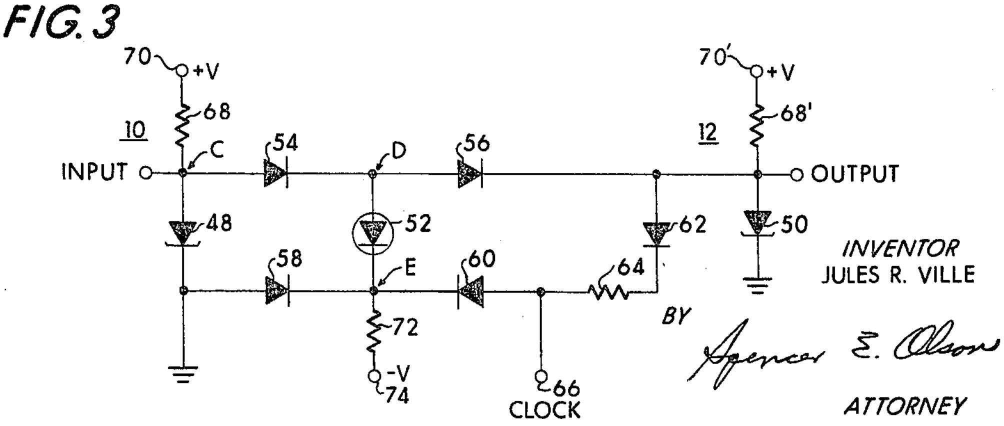
FIG. 3 is a schematic diagram of a tunnel diode shift register employing a stored charge information transfer circuit in accordance with the present invention.
Figure 5:
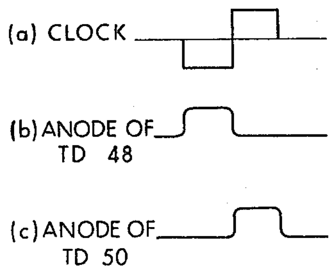
FIG. 5 is a timing diagram of waveforms associated with the operation of the circuit shown in FIG. 3; and, FIG. 6 is a simplified circuit diagram of an OR logic circuit embodiment of the present invention.

The information transfer concept of the present invention is not limited to transistor flip-flop configurations, but is adaptable as a transfer mechanism between any two bistable devices. For example, a hybrid circuit using tunnel diodes for the high speed bistable elements and a charge-storage diode for rapid charge transfer is shown in FIG. 3. Bistable stages 10 and 12 comprise tunnel diodes 48 and 50, respectively, and the diode information transfer network again comprises a shunt connected charge-storage diode 52 and series connected input and output isolation diodes 54 and 56, respectively. In this instance, however, the transfer network also includes two additional diodes 58 and 60, and a reset path including diode 62 and resistor 64. A square wave clock source, represented by terminal 66, controls the shifting and reset functions. The clock source waveform is shown in FIG. 5(*a*). Diodes 54 through 62 are high speed, high conduction, low capacity switching diodes.

Figure 4:
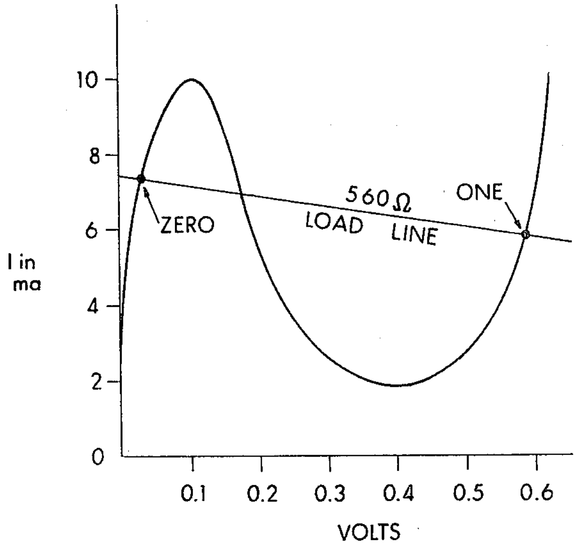
FIG. 4 is a typical tunnel diode characteristic curve.

The cathode terminals of tunnel diodes 48 and 50 are connected to ground, and the anode terminals are respectively connected through bias resistors 68 and 68′ to a source of positive bias potential represented by terminals 70 and 70′. The tunnel diodes are D.C. biased to a level sufficiently below the peak current that it will not false trigger and yet high enough that it can be triggered easily and provide usable output current. For example, consider the typical tunnel diode characteristic curve shown in FIG. 4. In this example, the tunnel diode is D.C. biased to seven milliamperes, which is sufficiently below the peak current (10±1 ma.). Each tunnel diode bistable may be triggered and reset to high-voltage and low-voltage states representing the binary "one" and "zero" conditions, respectively, as indicated on the tunnel diode characteristic curve of FIG. 4.

The junction of tunnel diode 48 and resistor 68, point C, is connected to the anode of diode 54, and the cathode of diode 54 is connected to a junction point D; the anode of diode 56 is connected to junction point D and the cathode is connected to the anode of tunnel diode 50. The anode of charge-storage diode 52 is connected to junction D, and the cathode is connected to a junction point E. The anode of diode 58 is connected to ground, and the cathode is connected to junction E. The cathode of diode 60 is connected to junction E, and the anode is connected to clock source terminal 66. Clock terminal 66 is also connected through resistor 64 and diode 62 to the anode of tunnel diode 50, the anode of diode 62 being connected to the anode of diode 50. Junction point E is also connected through bias resistor 72 to a source of negative bias potential for charge-storage diode 52, represented by terminal 74.

Diodes 52 and 54 are chosen such that the sum of their forward voltage drops is greater than the sum of the forward voltage drops of diodes 58 and 48 when tunnel diode 48 is in the low-voltage or "zero" state, but less than the sum of the forward voltage drops of diodes 58 and 48 when tunnel diode 48 is in the high-voltage or "one" state. To enable a clearer understanding of the operation, it will be assumed that the forward voltage drops of diodes 54 and 56 are each 0.4 volt and the forward voltage drops of diodes 52 and 58 are each 0.6 volt. Referring to the tunnel diode characteristic curve of FIG. 4, consider that the forward voltage drop across the tunnel diode is 0.1 volt in the "zero" condition and 0.5 volt in the "one" condition.

In operation, if tunnel diodes 50 and 48 are both in the low-voltage or "zero" condition during the negative swing of the clock waveform, diode 60 will be cut off and current will flow in the forward direction through diode 58 and resistor 72. Point B is then at a potential of —0.6 volt due to the forward voltage drop across diode 58. Since the voltage drop across tunnel diode 48 is about 0.1 volt in the "zero" state, the difference in voltage between points C and E is equal to or less than 0.7 volt, thereby keeping charged storage diode 52 and diode 54 cut off. Consequently, no charge is stored at the junction of diode 52.

The positive swing of the clock waveform causes diode 60 to be forward-biased into conduction, but since charge-storage diode 52 is reverse biased, the positive swing will have no effect upon the charge-storage diode and there will be no transfer of charge. Hence, the "zero" information from bistable stage 10 is effectively transferred to bistable stage 12 since tunnel diode 50 remains in the low-voltage state.

If tunnel diode 48 is in the high-voltage or "one" state with tunnel diode 50 in the "zero" state during the negative clock swing, point C will be at a positive potential of 0.5 volt, point D will be at a positive potential of 0.1 volt (+0.5 v. at point C minus the 0.4 volt forward voltage drop of diode 54), and point E will be at a negative potential of 0.5 volt (+.1 v. at point D minus the 0.6 volt forward voltage drop of diode 52). Consequently, diode 58 is not conducting, and current flows through forward conducting diodes 54 and 52. Charge-storage diode 52 thereby removes the charge from tunnel diode 48 and temporarily stores it.

The positive clock swing causes diode 60 to conduct in the forward direction and charge-storage diode 52 to conduct in the reverse direction, thereby transferring the charge stored in diode 52 through diode 56 into tunnel diode 50. This charge transfer sets tunnel diode 50 to the high-voltage or "one" state.

The next following negative clock swing causes diode 62 to conduct in the forward direction through current limiting resistor 64, thereby resetting tunnel diode 50 to the "zero" condition. A timing diagram of the clock and tunnel diode anode terminal waveforms for this last-mentioned operation (where tunnel diode 48 is initially in the "one" state and tunnel diode 50 is in the "zero" state) as shown in FIG. 5.

Figure 6:
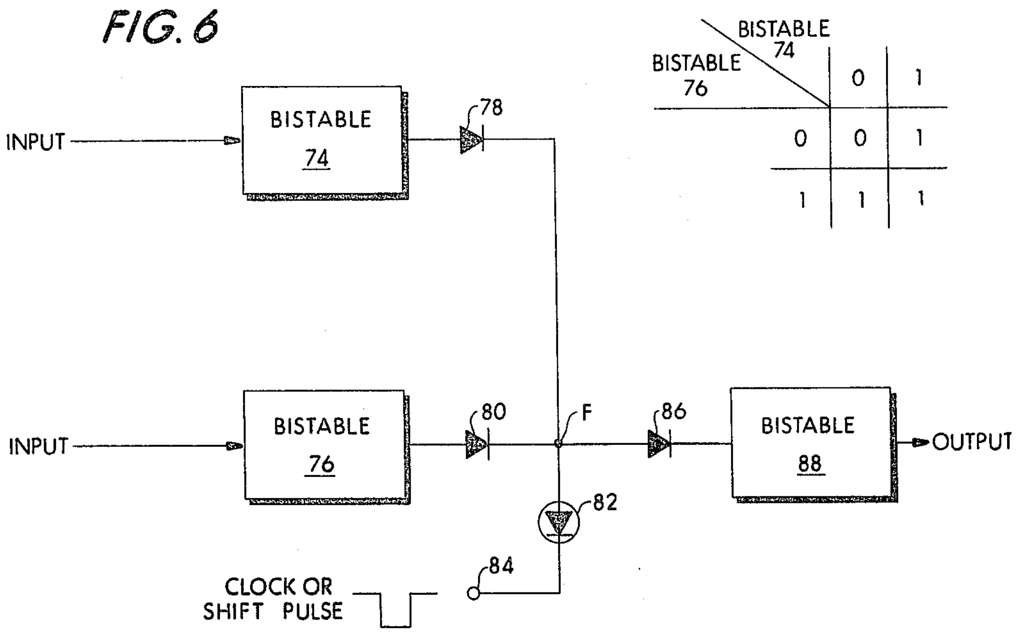

An example of logic circuit configuration embodying the invention is the OR circuit shown in FIG. 6 which comprises two input bistable circuits 74 and 76 each having respective input coupling diodes 78 and 80, the cathodes of which are connected together at junction F. As before, a shunt connected charge-storage diode 82 is employed with its anode connected to junction F and its cathode connected to a source of clock or shift pulses, represented by terminal 84. An output coupling diode 86 is serially connected fom junction F to an output bistable circuit 88, the anode of diode 86 being connected to junction F.

The operation of the circuit of FIG. 6 is very similar to that of the circuit of FIG. 7. Considering that the "one" and "zero" conditions of the bistables are identical to those described with respect to FIG. 3, if bistables 74 and 76 are both in the "zero" state, no charge will be transferred to diode 82 during the shift pulse, and, at the end of the shift pulse, bistable 88 will remain in the "zero" state. If bistable 74 is in the "one" state and bistable 76 is in the "zero" state, a charge will be removed from bistable 74 through diode 78 to charge-storage diode 82 during the shift pulse, and this stored charge will be transferred through diode 86 at the end of the shift pulse to change the state of bistable 88 to the "one" condition. If bistable 76 is in the "one" condition and bistable 74 is in the "zero" condition, a charge transfer will take place through diode 80 to diode 82 and then through diode 86 to put bistable 88 in the "one" condition. If both bistable 74 and bistable 76 are in the "one" condition, the charge-storage diode will build up a charge removed from both of the input bistables and transfer this charge to bistable 88 to place it in the "one" condition. The truth table for this OR logic is shown adjacent the block diagram of FIG. 6.

From the foregoing it is seen that the applicant has provided a unique information transfer circuit useful in shift registers, binary sequence generators, and logic circuits. The circuit provides a relatively simple means of sampling, temporarily storing, and transferring binary information from one bistable device to another. The diode network is adaptable for use with conventional bistable circuits or bistable devices using newly available components to provide higher speeds of operation. Shifting is provided by the charge transfer function of one or more diodes, and capacitors are not required, thereby making the circuit particularly suitable for microcircuit applications.

Although three applications of the inventive concept have been described, other circuit arrangements are possible. Therefore, it is the applicant's intention that the invention not be limited to what has been specifically shown and described except insofar as such limitations appear in the appended claims.

What is claimed is:

1. A stored charge information transfer circuit comprising, in combination, first and second bistable circuits having respective input and output terminals, first and second diodes serially connected between the output of said first bistable and the input of said second bistable, a source of pulses for changing the state of said first bistable, and a semiconductor junction diode connected between the junction of said first and second diodes and said pulse source, said semiconductor diode being reverse biased in response to the quiescent condition of said pulse source and being forward biased in response to an applied pulse for at least one of the binary conditions of said first bistable, said first, second and semiconductor diodes being so poled that for one of the binary conditions of said first bistable a pulse from said pulse source causes current to flow from said first bistable to said semiconductor diode and said second diode to be cut off for the duration of the pulse, and termination of said pulse causes current to flow in the reverse direction from said semiconductor diode to said second bistable.

2. An information transfer circuit in accordance with claim 1 further including a third bistable having input and output terminals, and a third diode connected between the output terminal of said third bistable and the junction of said first and second diodes, said third diode being so poled that for one of the binary conditions of said third bistable a pulse from said pulse source causes current to flow from said third bistable to said semiconductor diode and said second diode to be cut off for the duration of the pulse, and termination of said pulse causes current to flow in the reverse direction from said semiconductor diode to said second bistable.

3. An information transfer circuit in accordance with claim 1 wherein each of said first and second bistables comprises a tunnel diode having first and second electrodes and means for biasing said tunnel diode, said first and second diodes are serially connected from the first electrode of said first bistable tunnel diode to the first electrode of said second bistable tunnel diode, and the second electrodes of said tunnel diodes are connected to a first source of reference potential, and further including a third diode connected between said pulse source and said semiconductor diode for providing isolation from the pulse source during forward conduction of said semiconductor diode, a fourth diode connected between the second electrode of said first bistable tunnel diode to the junction of said third diode and said semiconductor diode for maintaining the semiconductor diode in its off condition during one of the binary conditions of said first bistable, a second source of reference potential connected to the junction of said third, fourth, and semiconductor diodes, and means connected between said pulse source and the first electrode of said second bistable tunnel diode for providing a reset signal to said second bistable.

4. An information transfer circuit in accordance with claim 1 wherein each of said first and second bistables comprises a saturated transistor circuit including a transistor having emitter, collector and base electrodes, and said first and second diodes are serially connected from the base electrode of said first bistable transistor to the base electrode of said second bistable transistor.

5. A tunnel diode shift register comprising, in combination, first and second tunnel diodes, a source of positive bias potential, means respectively connecting the anodes of said tunnel diodes to said positive bias source, a source of reference potential, means respectively connecting the cathodes of said tunnel diodes to said reference source, first and second diodes serially connected from the anode of said first tunnel diode to the anode of said second tunnel diode with the anode of said first diode connected to the anode of said first tunnel diode and the cathode of said second diode connected to the anode of said second tunnel diode, a source of negative bias potential, a charge-storage diode connected between the junction of said first and second diodes and said negative bias source, a source of pulses alternately having positive and negative voltage conditions, a third diode connected between said pulse source and the cathode of said charge-storage diode, a fourth diode connected from said source of reference potential to the cathode of said charge-storage diode, said negative bias source being connected to the junction of the cathode of said third, fourth, and charge-storage diodes, and means connected between said pulse source and the anode of said second tunnel diode and operative to provide a reset signal to said second tunnel diode, said tunnel diodes being bistable and having a high-voltage state and a low-voltage state, said third diode being operative to isolate the cathode of said charge-storage diode from said pulse source during the negative voltage condition, said fourth diode being operative to maintain said charge storage diode cut off during the low-voltage state of said first tunnel diode, and said bias and reference potentials being operative when said first tunnel diode is in the high-voltage state to forward-bias said charge-storage diode in response to a negative voltage condition at said pulse source and to reverse-bias said charge-stosage diode in response to return of said pulse source to the positive voltage condition.

6. A transistor shift register comprising, in combination, first and second resistance coupled saturated transistor bistables, each of said bistables including first and second transistors each having emitter, collector and base electrodes, first and second diodes serially connected between the base electrodes of said first transistors of said first and second bistables, third and fourth diodes serially connected between the base electrodes of said second transistors of said first and second bistables, the anodes of said first and third diodes being connected to respective base electrodes of said first bistable and the cathodes of said second and fourth diodes being connected to respective base electrodes of said second bistable, first and second semiconductor junction diodes serially connected between the junction of said first and second diodes and the junction of said third and fourth diodes with their cathodes connected together, and a source of negative going shift pulses connected to the cathodes of said semiconductor diodes, said semiconductor diodes being reverse biased in response to the quiescent condition of said pulse source and being forward biased in response to a negative going pulse from said pulse source.

7. A stored charge information transfer circuit comprising, in combination, first and second charge storage bistable devices having respective input and output terminals, a charge-storage diode, an input coupling diode connected to conduct current in the forward direction from the output terminal of said first bistable to the anode of said charge-storage diode, an output coupling diode connected to conduct current in the forward direction from the anode of said charge-storage diode to the input terminal of said second bisable, and a source of negative going shift pulses connected to the cathode of said charge-storage diode, said charge-storage diode being reverse biased in response to the quiescent condition of said pulse source and being forward biased in response to the application of a negative going pulse for at least one of the binary conditions of said first bistable, whereby said charge-storage diode is operative while forward-biased to remove any stored charge from said first bistable, to temporarily store said charge, and to rapidly transfer said charge to said second bistable upon return of said pulse source to the quiescent condition.

8. An information transfer circuit in accordance with claim 7 wherein each of said bisables comprises a saturated transistor circuit including a transistor having emitter, collector and base electrodes, said input coupling diode is connected to conduct current from the base electrode of said first bistable transistor, said output coupling diode is connected to conduct current to the base electrode of said second bistable transistor, and said first bistable transistor is operative to develop an excess stored charge at its base electrode when fully conducting and to rapidly transfer said charge to said charge-storage diode upon being cut off by the forward biasing of said charge-storage diode.

9. A transistor shift register comprising, in combination, first and second charge storage bistable circuits, each of said bistables comprising first and second resistance coupled junction transistors each having emitter, collector and base electrodes, first and second charge-storage diodes, first and second input coupling diodes respectively connected to conduct current in the forward direction from the base electrodes of said first and second transistors of said first bistable to the anodes of said first and second charge-storage diodes, respectively, first and second output coupling diodes respectively connected to conduct current in the forward direction from the anodes of said first and second charge-storage diodes to the base electrodes of said first and second transistors of said second bistable, and a source of negative going shift pulses connected to the cathodes of said first and second charge-storage diodes, said charge-storage diodes being reversed biased in response to the quiescent condition of said pulse source and being forward biased in response to the application of a negative going pulse from said pulse source, each of said first bistable transistors being operative to develop an excess stored charge in its base-emitter junction when fully conducting and to rapidly transfer said charge to respective ones of said charge-storage diodes upon being cut off by the forward biasing of said charge-storage diodes, said charge-storage diodes thereby being operative while forward-biased to remove any stored charge from respective ones of said first bistable transistor base-emitter junctions, to temporarily store said charge, and to rapidly transfer said charge to respective ones of said second bistable transistor base electrodes upon return of said pulse source to the quiescent condition.

References Cited by the Examiner

UNITED STATES PATENTS

| | | | |
|---|---|---|---|
| 3,106,644 | 10/1963 | Retzinger | 307—88.5 |
| 3,164,730 | 1/1965 | Urban | 307—88.5 |
| 3,225,220 | 12/1965 | Cubert | 307—88.5 |

JOHN W. HUCKERT, *Primary Examiner.*

A. J. JAMES, *Assistant Examiner.*